United States Patent [19]
Leichty et al.

[11] Patent Number: 5,920,564
[45] Date of Patent: Jul. 6, 1999

[54] METHOD AND APPARATUS FOR DIRECT MEMORY ACCESS ON TRANSMIT COMPLETE

[75] Inventors: Philip Lynn Leichty, Rochester; Albert Alfonse Slane, Oronoco, both of Minn.

[73] Assignee: International Business Machines Corporation, Armonk, N.Y.

[21] Appl. No.: 08/846,632

[22] Filed: Apr. 30, 1997

[51] Int. Cl.$^6$ .................................................. H04L 12/56
[52] U.S. Cl. ......................... 370/395; 370/471; 370/474
[58] Field of Search .................................... 370/363, 378, 370/379, 381, 382, 395, 471, 474; 395/842, 844, 846

[56] References Cited

U.S. PATENT DOCUMENTS

| | | | |
|---|---|---|---|
| 5,533,020 | 7/1996 | Byrn et al. | 370/60.1 |
| 5,546,385 | 8/1996 | Capsi et al. | 370/412 |
| 5,548,587 | 8/1996 | Bailey et al. | 370/60.1 |
| 5,644,784 | 7/1997 | Peek | 395/844 |
| 5,708,779 | 1/1998 | Graziano et al. | 395/200.8 |

*Primary Examiner*—Chau Nguyen
*Assistant Examiner*—Kenneth Vanderpuye
*Attorney, Agent, or Firm*—Joan Pennington

[57] ABSTRACT

A method and apparatus are provided for processing data transmissions across data communications networks including ATM networks, for example, to support arbitrary user action on transmit completes. Sequential transport stream packets are obtained. A predetermined field of each transport stream packet is interrogated to identify a DMA on transmit complete. The transmission of a last cell in each transport stream packet is identified. Then responsive to identifying the DMA on transmit complete, an address for a DMA descriptor is fetched from the transport stream packet. The DMA descriptor is enqueued to a DMA engine to execute the DMA descriptor.

15 Claims, 4 Drawing Sheets

METHOD AND APPARATUS FOR DIRECT MEMORY ACCESS ON TRANSMIT COMPLETE

FIELD OF THE INVENTION

The present invention relates to the data processing field, and more particularly, relates to a method and apparatus for processing data transmissions across data communications networks including ATM networks.

DESCRIPTION OF THE PRIOR ART

An Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed multimedia.

In ATM networks, one known algorithm called the leaky bucket algorithm has been used to determine when a cell for a single session may be transmitted. This leaky bucket algorithm may be used to determine if a cell is allowed to be transmitted for any single session at a given time. Scheduling a multiplicity of sessions can be provided by running the leaky bucket algorithm at any time t for all the sessions to determine which sessions may be scheduled for transmission at that time. Then, cells from these sessions may be scheduled based on their assigned priorities. The leaky bucket algorithm is described in ATM Forum Technical Committee Traffic Management Specification, Version 4.0 (af-tm-0056.000) April, 1996.

A method and apparatus for scheduling the transmission of cells in a number of data streams over a common communications link is disclosed in U.S. Pat. No. 5,533,020, entitled ATM CELL SCHEDULER, issued Jul. 2, 1996 to Byrn et al., and assigned to the present assignee. The subject matter of the above-identified patent is incorporated herein by reference. Other improved cell schedulers and scheduling methods are disclosed in copending patent applications Ser. No. 08/823,155, filed on Mar. 25, 1997, entitled: AN EARLIEST DEADLINE FIRST COMMUNICATIONS CELL SCHEDULER AND SCHEDULING METHOD FOR TRANSMITTING EARLIEST DEADLINE CELLS FIRST, by Gary S. Delp et al., and assigned to the present assignee and Ser. No. 08/823,865, filed on filed on Mar. 25, 1997 U.S. Pat. No. 5,844,890, entitled: COMMUNICATIONS CELL SCHEDULER AND SCHEDULING METHOD FOR PROVIDING PROPORTIONAL USE OF NETWORK BANDWIDTH, by Gary S. Delp et al., and assigned to the present assignee. The disclosures of the above-identified patent applications are incorporated herein by reference.

In certain situations, it would be nice to be able to perform certain actions when a packet has been transmitted. For example, in conventional arrangements, many actions requires software intervention, when a packet has been transmitted. It would be advantageous to have a communication cell scheduler and scheduling method, for example, to support arbitrary user action on transmit completes. As used in the following specification and claims, the term transport stream packet means a transport stream packet including a transport stream packet header.

SUMMARY OF THE INVENTION

A principal object of the present invention is to provide an improved method and apparatus for processing data transmissions across data communications networks including ATM networks, for example, to support arbitrary user action on transmit completes. Other important objects of the present invention are to provide such method and apparatus substantially without negative effects and that overcome some disadvantages of prior art arrangements.

In brief, method and apparatus are provided for processing data transmissions across data communications networks including ATM networks, for example, to support arbitrary user action on transmit completes. Sequential transport stream packets are obtained. A predetermined field of each transport stream packet is interrogated to identify a DMA on transmit complete. The transmission of a last cell in each transport stream packet is identified. Then responsive to identifying the DMA on transmit complete, an address for a DMA descriptor is fetched from the transport stream packet. The DMA descriptor is enqueued to a DMA engine to execute the DMA descriptor.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
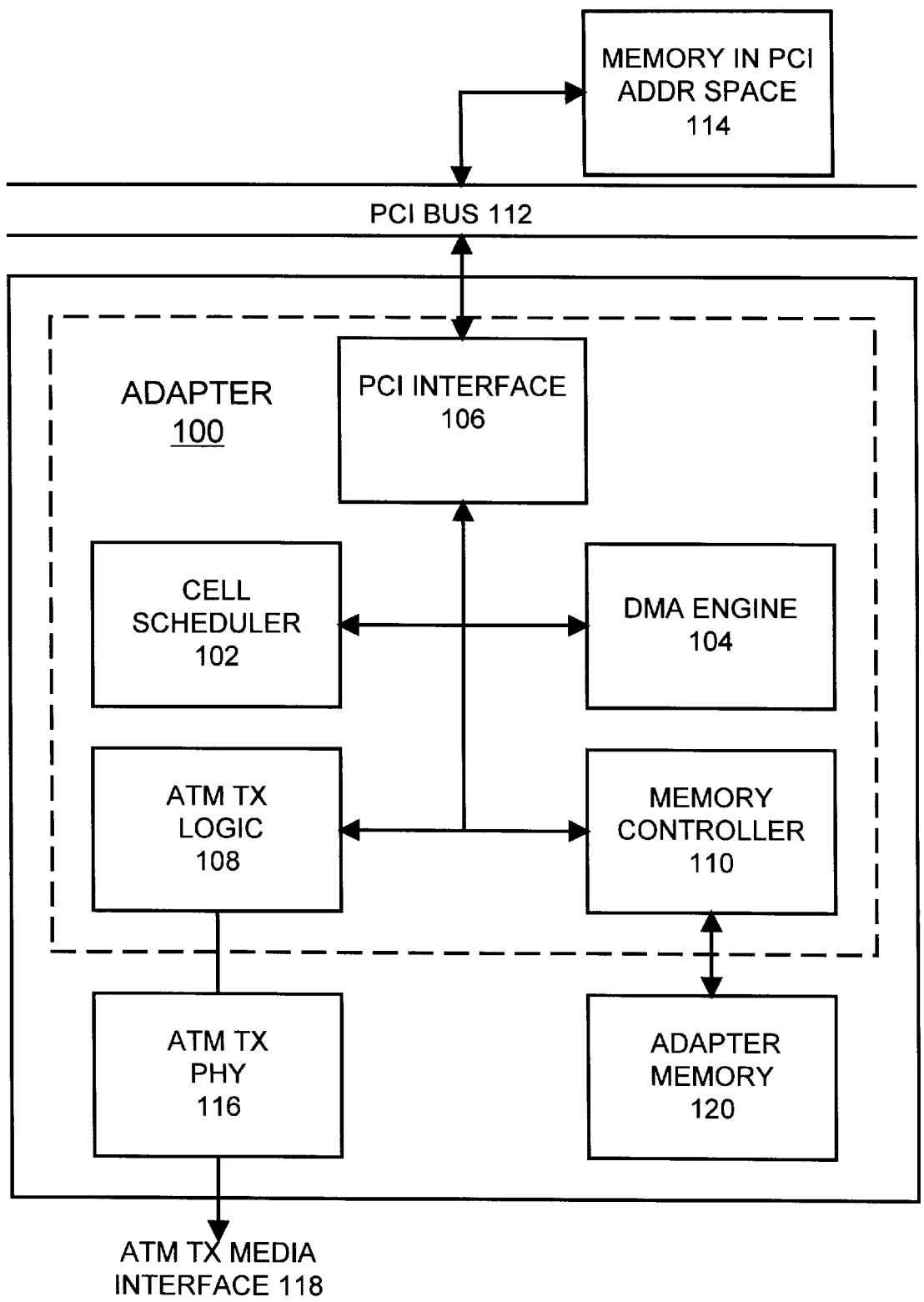
FIG. 1 is a block diagram representation illustrating an adapter for a computer and data communications network system of the preferred embodiment.

Having reference now to the drawings in FIG. 1, there is shown an adapter generally designated by 100 and arranged in accordance with the preferred embodiment. As shown in FIG. 1, adapter 100 includes at least one cell scheduler 102 of the preferred embodiment, a direct memory access (DMA) engine 104, a peripheral component interconnect (PCI) interface 106, an asynchronous transfer mode (ATM) transmission logic 108, and a memory controller 110. The PCI interface 106 is connected to a peripheral component interconnect (PCI) bus 112 coupled to a memory 114 in PCI address space. The ATM transmission logic 108 is connected to an ATM transmission (TX) physical (PHY) layer 116 connected to an ATM TX media interface 118. The memory controller 110 is connected to an adapter memory 120. Adapter 100 provides interface and translator functions between the peripheral component interconnect (PCI) bus 112 and the ATM TX PHY layer 116.

Figure 2:
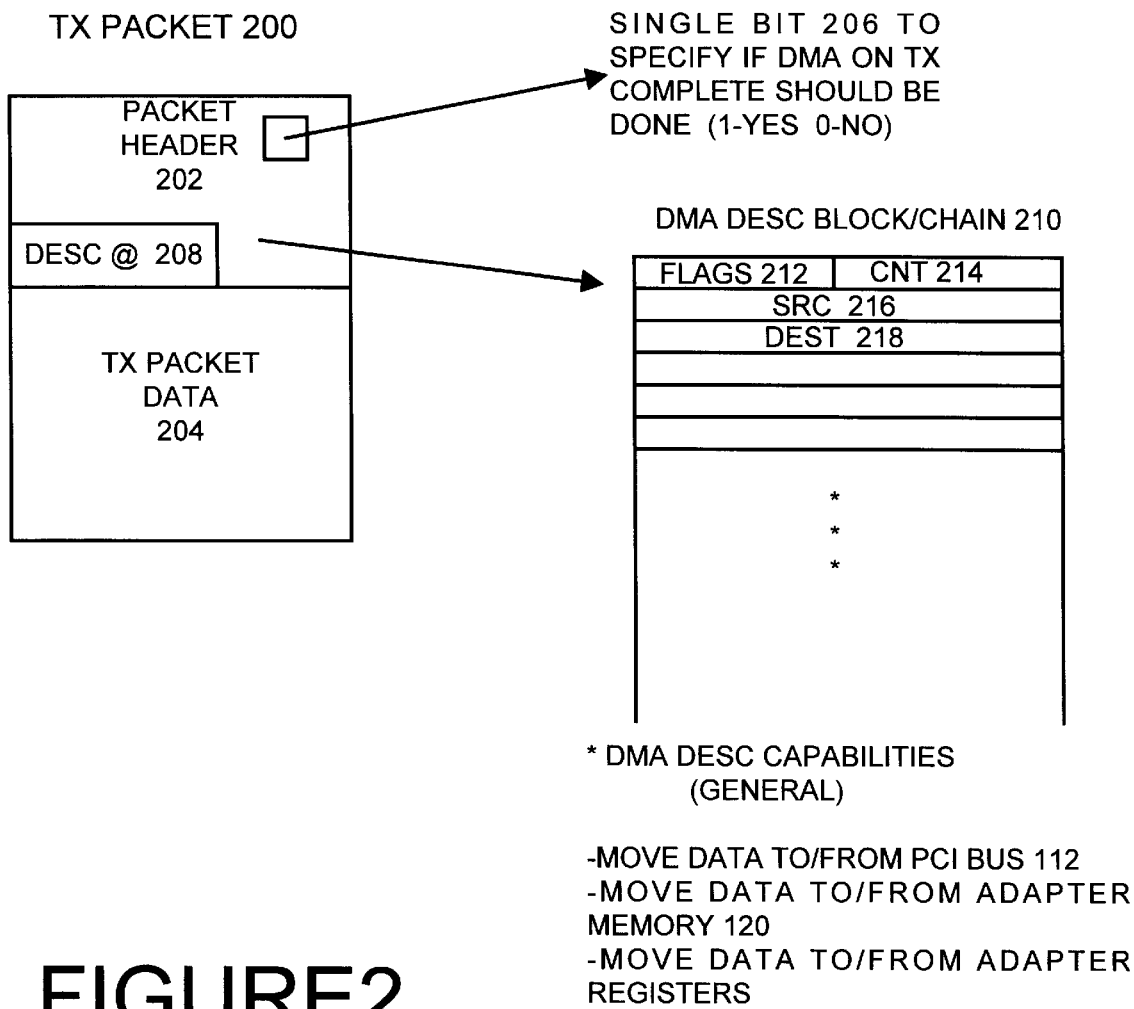
FIG. 2 is a chart illustrating a transmit packet structure including a DMA descriptor address and a DMA descriptor block or chain utilized in the operation of the cell scheduler of the preferred embodiment of FIG. 1.

Referring to FIG. 2, a transmit packet 200 and a DMA descriptor block or chain 210 of the preferred embodiment are shown. The transmit packet 200 includes a packet header 202 and a transmit packet data 204. The packet header 202 includes a single bit field 206 to specify if DMA on transmit should be done and a DMA descriptor address (DESC @)

208. When DMA on complete is enabled, for example, with the single bit field 206 set to 1, the DMA descriptor address 208 is placed in the transmit packet header. In accordance with features of the preferred embodiment, when the packet 200 has finished transmitting, a DMA descriptor block or chain 210 is then enqueued to the DMA engine 104 and is executed. While this mechanism is simple, it is very powerful as it allows the user to do anything that can be described in the DMA descriptor chain 210. The DMA descriptor chain 210 includes predetermined flags 212, a count value 214, a source address 216 and a destination address 218. For example, as listed in FIG. 2, the general capabilities provided by the DMA descriptor chain 210 are to move data to and from the PCI bus 112, to move data to and from the adapter memory 120 and to move data to and from adapter registers (not shown). The DMA descriptor chain 210 can be used to generate status, cleanup resources and various other post processing after a packet transmission is completed. The DMA descriptor chain 210 can be used for data stream pacing. For example, after a complete packet is transmitted, the DMA descriptor chain 210 can be used to get more data to enqueue for transmit and enqueue another DMA descriptor chain 210 for self timed data streams.

Another use of the DMA transmit on complete mechanism, is for switches and routers including multiple adapters 100. A first adapter 100 can route transmit packets to another adapter 100 substantially without software intervention using the DMA descriptor chain 210. Routing transmit packets to another adapter 100 is done with cut through modes using the DMA descriptor chain 210. The DMA descriptor chain 210 provides a way to clean up resources after each packet is transmitted by the second adapter 100. Using the DMA on transmit function, a DMA descriptor chain 210 is built to free the resources after each packet is transmitted. The DMA descriptor chain 210 is placed in a received packet header automatically by the receive DMA descriptor, such as, for the cut through process.

Figure 3:
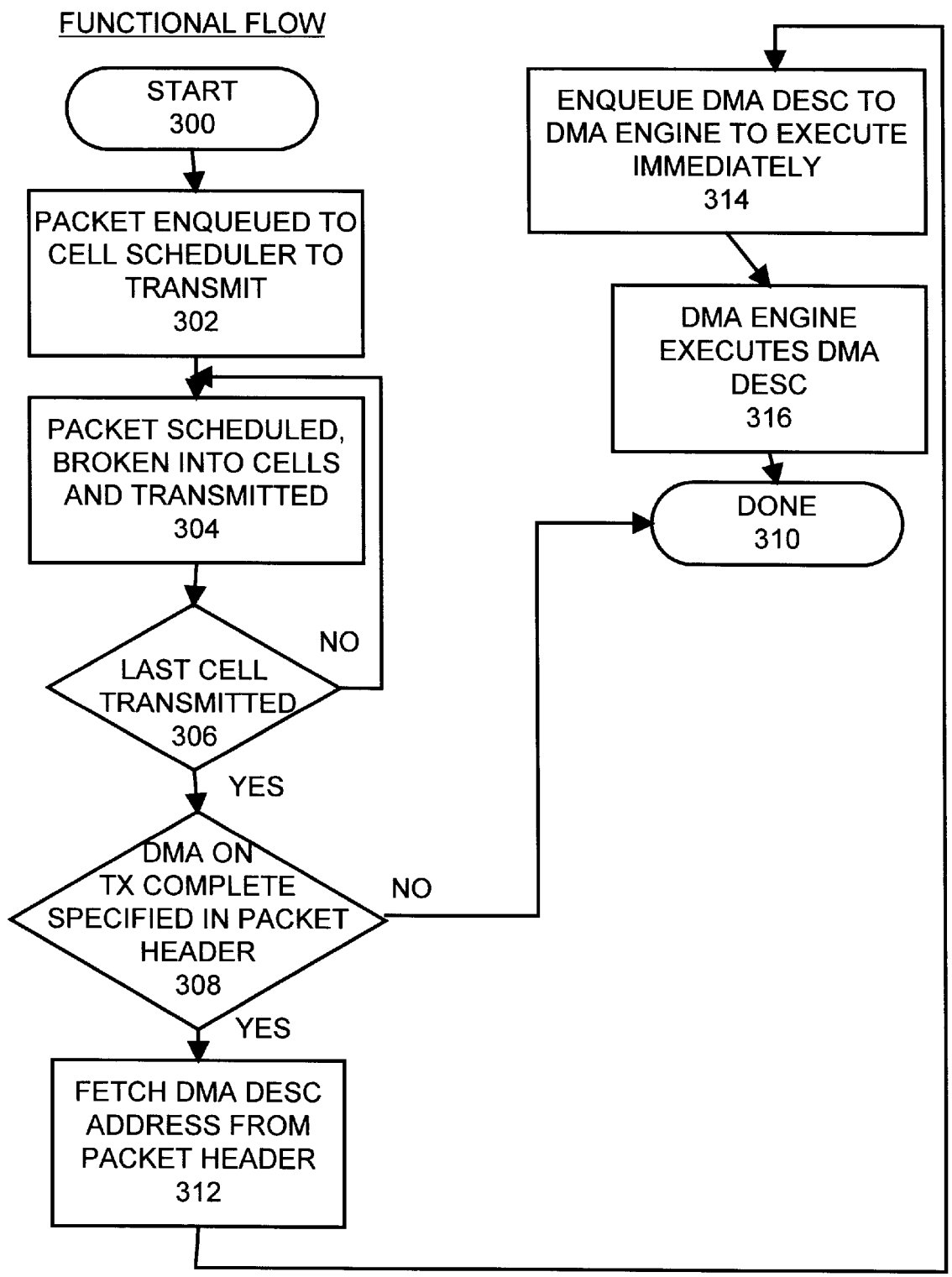
FIG. 3 is a flow chart illustrating sequential operations of a cell scheduler and a DMA engine of the preferred embodiment of FIG. 1.

Referring to FIG. 3, sequential operations of the preferred embodiment of the cell scheduler 102 and DMA engine 104 are shown starting at block 300. A packet enqueued to the cell scheduler 102 to transmit is identified as indicated at a block 302. The packet is scheduled, broken into cells and the cells are transmitted as indicated at a block 304. Checking for the transmission of the last cell is performed as indicated at a decision block 306. When the transmission of the last cell is identified, a predefined field of the transport stream packet header is interrogated to determine whether DMA on transmit complete is specified as indicated at a decision block 308. When DMA on transmit complete is not specified, this completes the sequential operations as indicated at a block 310.

When determined at decision block 308 that DMA on transmit complete is specified, a DMA descriptor address is fetched from packet header as indicated at a block 312. Then the DMA descriptor is enqueued to the DMA engine 104 to be executed immediately as indicated at a block 314. The DMA engine 104 executes the DMA descriptor as indicated at a block 316. This completes the sequential operations as indicated at block 310.

Figure 4:
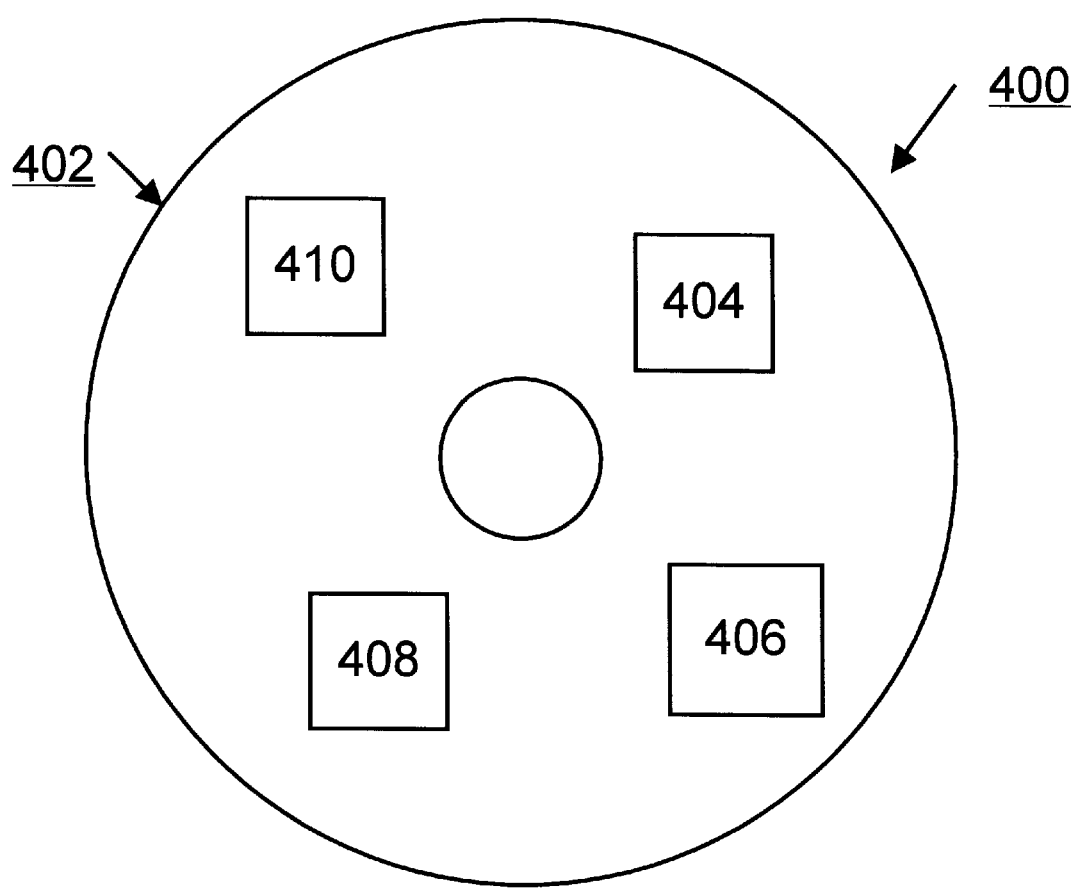
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the DMA on transmit complete methods of the preferred embodiment.

A sequence of program instructions or a logical assembly of one or more interrelated modules defined by the recorded program means 404, 406, 408, 410, direct the cell scheduler 102 for carrying out the DMA on transmit complete functions of the preferred embodiment.

While the present invention has been described with reference to the details of the embodiments of the invention shown in the drawing, these details are not intended to limit the scope of the invention as claimed in the appended claims.

What is claimed is:

1. A method for processing data transmissions across data communications networks including ATM networks, said method comprising the steps of:

obtaining sequential transport stream packets;

interrogating a predetermined field of each transport stream packet to identify a DMA on transmit complete;

breaking each transport stream packet into cells and transmitting said cells of each transport stream packet;

identifying the transmission of a last cell in each transport stream packet;

responsive to identifying said DMA on transmit complete, fetching an address for a DMA descriptor from said transport stream packet, and enqueueing said DMA descriptor to a DMA engine to execute said DMA descriptor.

2. A method for processing data transmissions across data communications networks including ATM networks as recited in claim 1 includes the step of providing a chain of said DMA descriptors.

3. A method for processing data transmissions across data communications networks including ATM networks as recited in claim 1 includes the step of providing said DMA descriptor with predetermined fields including predetermined flags, a data count value, a source address and a destination address.

4. A method for processing data transmissions across data communications networks including ATM networks as recited in claim 1 wherein said step of interrogating said predetermined field of each transport stream packet to identify a DMA on transmit complete includes the step of interrogating a predetermined packet header field.

5. A method for processing data transmissions across data communications networks including ATM networks as recited in claim 1 wherein said step of fetching said address for said DMA descriptor from said transport stream packet includes the step of fetching said address for said DMA descriptor from a predefined packet header field.

6. A method for processing data transmissions across data communications networks including ATM networks as recited in claim 1 wherein the step of enqueueing said DMA descriptor to said DMA engine to execute said DMA descriptor includes the step of generating a transmit complete event responsive to said DMA descriptor.

7. Apparatus for processing data transmissions across data communications networks including ATM networks, said method comprising the steps of:

means for obtaining sequential transport stream packets;

means for interrogating a predetermined field of each transport stream packet to identify a DMA on transmit complete;

breaking each transport stream packet into cells and transmitting said cells of each transport stream packet:

means for identifying the transmission of a last cell in each transport stream packet;

means responsive to identifying said DMA on transmit complete, for fetching an address for a DMA descriptor from said transport stream packet, and means for enqueueing said DMA descriptor to a DMA engine to execute said DMA descriptor.

8. Apparatus for processing data transmissions across data communications networks including ATM networks as recited in claim 7 further includes means for providing a chain of said DMA descriptors at said DMA descriptor address.

9. Apparatus for processing data transmissions across data communications networks including ATM networks as recited in claim 7 wherein said DMA descriptor includes predetermined fields for predetermined flags, a data count value, a source address and a destination address.

10. Apparatus for processing data transmissions across data communications networks including ATM networks as recited in claim 7 wherein said predetermined field interrogated to identify said DMA on transmit complete includes a predetermined transmit packet header field.

11. Apparatus for processing data transmissions across data communications networks including ATM networks as recited in claim 7 wherein said address for said DMA descriptor is provided in a predetermined transmit packet header field.

12. A computer program product for use in data communications network system having an adapter for processing data transmissions across data communications networks including ATM networks, the computer program product comprising:

a recording medium;

means, recorded on said recording medium, for obtaining sequential transport stream packets;

means, recorded on said recording medium, for interrogating a predetermined field of each transport stream packet to identify a DMA on transmit complete;

means, recorded on said recording medium, for identifying the transmission of a last cell in each transport stream packet;

means, recorded on said recording medium, responsive to identifying said DMA on transmit complete, for fetching an address for a DMA descriptor from said transport stream packet, and means, recorded on said recording medium, for enqueueing said DMA descriptor to a DMA engine to execute said DNA descriptor.

13. A computer program product as recited in claim 12 wherein said DMA descriptor includes predetermined fields for predetermined flags, a data count value, a source address and a destination address.

14. A computer program product as recited in claim 12 wherein said address for said DMA descriptor is provided in a predetermined transmit packet header field.

15. A computer program product as recited in claim 12 wherein said predetermined field interrogated to identify said DMA on transmit complete includes a predetermined transmit packet header field.

* * * * *

UNITED STATES PATENT AND TRADEMARK OFFICE
CERTIFICATE OF CORRECTION

PATENT NO.    : 5,920,564
DATED         : July 6, 1999
INVENTOR(S)   : Philip Lynn Leichty and Albert Alfonse Slane It is certified that error appears in the above-identified patent and that said Letters Patent is hereby corrected as shown below:

Claim 12, Col. 6, Line 16, "DNA" should be --DMA--.

Signed and Sealed this

Twenty-third Day of November, 1999

Attest:

Q. TODD DICKINSON

Attesting Officer

Acting Commissioner of Patents and Trademarks